United States Patent
Cooper et al.

(10) Patent No.: US 9,221,477 B2
(45) Date of Patent: *Dec. 29, 2015

(54) COMMUNICATIONS SYSTEM AND METHOD FOR A RAIL VEHICLE

(71) Applicant: GENERAL ELECTRIC COMPANY, Schenectady, NY (US)

(72) Inventors: Jared Klineman Cooper, Palm Bay, FL (US); John William Brand, Melbourne, FL (US); Nick David Nagrodsky, Melbourne, FL (US); Keith Gilbertson, Grain Valley, MO (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/945,993

(22) Filed: Jul. 19, 2013

(65) Prior Publication Data
US 2013/0299645 A1  Nov. 14, 2013

Related U.S. Application Data

(63) Continuation of application No. 12/552,533, filed on Sep. 2, 2009, now Pat. No. 8,494,695.

(51) Int. Cl.
| | |
|---|---|
| G06F 17/00 | (2006.01) |
| G05D 1/00 | (2006.01) |
| B61L 15/00 | (2006.01) |
| H04L 29/06 | (2006.01) |
| H04L 29/08 | (2006.01) |
| H04L 12/28 | (2006.01) |

(52) U.S. Cl.
CPC ....... B61L 15/0018 (2013.01); H04L 29/08657 (2013.01); H04L 67/12 (2013.01);
(Continued)

(58) Field of Classification Search
USPC ........ 246/2 R, 122 R, 3, 5; 701/19, 408–409; 370/328–329, 436; 104/88.01, 888.06; 455/456.1, 456.3, 456.6; 379/242
See application file for complete search history.

(56) References Cited

U.S. PATENT DOCUMENTS 3,944,986 A * 3/1976 Staples ...................... 104/88.04
5,081,707 A   1/1992 Schorman et al.
(Continued)

FOREIGN PATENT DOCUMENTS

JP    11-244785    * 9/1999

OTHER PUBLICATIONS

Multi-User, Time-Reversal UWB Communication for Railway Systems; Saghir, H.; Heddebaut, M.; Elbahhar, F.; Rouvaen, J.M.; Rivenq, A.; Vehicular Technology Conference, 2007. VTC-2007 Fall. 2007 IEEE 66th; Digital Object Identifier: 10.1109/VETECF.2007.302; Publication Year: 2007 , pp. 1416-1420.*

(Continued)

Primary Examiner — Cuong H Nguyen
(74) Attorney, Agent, or Firm — GE Global Patent Operation; John A. Kramer

(57) ABSTRACT

A rail vehicle includes of one or more locomotives and may further include one or more rail cars, and the rail vehicle further includes a locator element, a communications device and a control module located on the rail vehicle. The locator elements provide a location information of the rail vehicle to a control module. The control module is coupled to the communications device and the locator element. The control module determines control settings for controlling the operations of the communications device based on the location of the rail vehicle. The communications device sends and/or receives data, including communications data, off-board the rail vehicle.

16 Claims, 4 Drawing Sheets

(52) U.S. Cl.
CPC ............... *H04L 67/14* (2013.01); *H04L 67/18* (2013.01); *H04L 69/14* (2013.01); *H04L 12/2801* (2013.01); *H04L 29/08936* (2013.01)

(56) References Cited

U.S. PATENT DOCUMENTS

| | | | |
|---|---|---|---|
| 5,235,633 | A | 8/1993 | Dennison et al. |
| 5,280,521 | A | 1/1994 | Itoh |
| 5,442,805 | A | 8/1995 | Sagers et al. |
| 5,678,182 | A | 10/1997 | Miller et al. |
| 5,734,971 | A | 3/1998 | Thayer et al. |
| 5,758,332 | A | 5/1998 | Hirotani |
| 5,819,180 | A | 10/1998 | Alperovich et al. |
| 6,052,600 | A | 4/2000 | Fette et al. |
| 6,169,897 | B1 | 1/2001 | Kariya |
| 6,181,935 | B1 | 1/2001 | Gossman et al. |
| 6,252,544 | B1 | 6/2001 | Hoffberg |
| 6,285,868 | B1 | 9/2001 | LaDue |
| 6,351,638 | B1 | 2/2002 | Robinson |
| 6,492,944 | B1* | 12/2002 | Stilp ........................... 342/387 |
| 6,549,768 | B1 | 4/2003 | Fraccaroli |
| 6,571,082 | B1 | 5/2003 | Rahman et al. |
| 6,701,144 | B2 | 3/2004 | Kirbas et al. |
| 6,782,264 | B2* | 8/2004 | Anderson ................. 455/456.1 |
| 6,912,386 | B1 | 6/2005 | Himberg et al. |
| 6,937,877 | B2 | 8/2005 | Davenport |
| 7,035,637 | B2* | 4/2006 | Motegi et al. ............. 455/435.1 |
| 7,167,713 | B2* | 1/2007 | Anderson ................. 455/456.1 |
| 7,509,437 | B2 | 3/2009 | Dowling |
| 7,653,465 | B1 | 1/2010 | Geiger et al. |
| 7,764,231 | B1* | 7/2010 | Karr et al. ..................... 342/457 |
| 7,885,604 | B2* | 2/2011 | Wee et al. ..................... 455/63.1 |
| 8,233,457 | B1* | 7/2012 | Chen et al. ..................... 370/332 |
| 2002/0027511 | A1* | 3/2002 | Horita et al. .................. 340/988 |
| 2003/0151520 | A1 | 8/2003 | Kraeling et al. |
| 2004/0100938 | A1 | 5/2004 | Aiken, II et al. |
| 2004/0114631 | A1 | 6/2004 | Aiken, II et al. |
| 2004/0162019 | A1* | 8/2004 | Horita et al. ................. 455/3.02 |
| 2007/0219680 | A1 | 9/2007 | Kumar et al. |
| 2008/0004000 | A1* | 1/2008 | Boss et al. ..................... 455/423 |
| 2008/0026767 | A1 | 1/2008 | Krstulich |
| 2008/0161986 | A1 | 7/2008 | Breed |
| 2008/0207222 | A1* | 8/2008 | Bhattacharya et al. .... 455/456.1 |
| 2012/0190380 | A1* | 7/2012 | Dupray et al. ............. 455/456.1 |

OTHER PUBLICATIONS

Performance evaluation of coordinated multi-point transmission schemes with predicted CSI; Li, Jingya ; Papadogiannis, Agisilaos ; Apelfrojd, Rikke ; Svensson, Tommy ; Sternad, Mikael; Personal Indoor and Mobile Radio Comm. (PIMRC), 2012 IEEE 23rd Inter. Symposium on; Digital Object ID: 10.1109/PIMRC.2012.6362501; Pub. Yr: 2012, pp. 1055-1060.*

Downlink soft handover using multi-cell MIMO for 4G-LTE smartphones; Sunghyun Cho ; Ji-Woong Choi; Consumer Electronics (ICCE), 2014 IEEE International Conference on; DOI: 10.1109/ICCE.2014.6775975; Publication Year: 2014 , pp. 207-208.*

First results of ground moving target analysis in TerraSAR-X data; Suchandt, S. ; Runge, H. ; Eineder, M. ; Breit, H. ; Kotenkov, A. ; Balss, U.; Geoscience and Remote Sensing Symposium, 2007. IGARSS 2007. IEEE International; DOI: 10.1109/IGARSS.2007.4423710; Publication Year: 2007 , pp. 3943.*

A Novel Mesh Division Scheme using Cognitive Pilot Channel in Cognitive Radio Environment; Qixun Zhang ; Zhiyong Feng ; Fang Tian ; Zheng Hu; Vehicular Technology Conference Fall (VTC 2009—Fall), 2009 IEEE 70$^{th}$ ; DOI: 10.1109/VETECF.2009.5379044 Publication Year: 2009 , pp. 1-6.*

Enrico Buracchini; The Software Radio Concept; IEEE Communications Magazine. Sep. 2000; pp. 138-143. cited by applicant Srikathyayani Srikaneswara et al., Design and Implementation of a Competely Reconfigurable Soft radio; Mobile and Portable Radio Research Group (MPRG), Virginia Tech, 2000 IEEE, pp. 7-11.*

Distributed autonomous multi-hop vehicle-to-vehicle communications over TV white space; Ihara, Y.; Kremo, H.; Altintas, O.; Tanaka, H.; Ohtake, M.; Fujii, T.; Yoshimura, C.; Ando, K.; Tsukamoto, K.; Tsuru, M.; Oie, Y.; Consumer Communications and Networking Conference (CCNC), 2013 IEEE; Year: 2013; pp. 336-344, DOI: 10.1109/CCNC.2013.6488467.*

Cloud-assisted GPS-driven dynamic spectrum access in cognitive radio vehicular networks for transportation cyber physical systems; Rawat, D.B.; Reddy, S.; Sharma, N.; Bista, B.B.; Shetty, S.; Wireless Communications and Networking Conference (WCNC), 2015 IEEE; Year: 2015; pp. 1942-1947, DOI: 10.1109/WCNC.2015.7127765.*

An IEEE 802.11p/WAVE implementation with synchronous channel switching for seamless dual-channel access (poster) Ameixieira, C.; Matos, J.; Moreira, R.; Cardote, A.; Oliveira, A.; Sargento, S.; Vehicular Networking Conference (VNC), 2011 IEEE Year: 2011; pp. 214-221, DOI: 10.1109/VNC.2011.6117103.*

Wireless communications based system to monitor performance of rail vehicles; Nejikovsky, B.; Keller, E; Railroad Conference, 2000. Proceedings of the 2000 ASME/IEEE Joint; Year: 2000; pp. 111-124, DOI: 10.1109/RRCON.2000.869993.*

Multi-User, Time-Reversal UWB Communication for Railway Systems; Saghir, H.; Heddebaut, M.; Elbahhar, F.; Rouvaen, J.M.; Rivenq, A.; Vehicular Technology Conference, 2007. VTC-2007 Fall. 2007 IEEE 66th; Digital Object Identifier: 10.1109/VETECF.2007.302; Publication Year: 2007, pp. 1416-1420.*

Location-Aware Two-Phase Coding Multi-Channel MAC Protocol (LA-TPCMMP) for MANETs; Lili Zhang; Boon-Hee Soong; Wendong Xiao; Wireless Communications, IEEE Transactions on; vol. 6 , Issue: 5 Digital Object Identifier: 10.1109/TWC.2007.360368; Publication Year: 2007, pp. 1659-1669.*

Performance evaluation of coordinated multi-point transmission schemes with predicted CSI; Li, Jingya; Papadogiannis, Agisilaos; Apelfrojd, Rikke; Svensson, Tommy; Sternad, Mikael; Personal Indoor and Mobile Radio Comm. (PIMRC), 2012 IEEE 23rd Inter. Symposium on; Digital Object Id: 10.1109/PIMRC.2012.6362501; Pub. Yr: 2012, pp. 1055-1060.*

Design and implementation of a completely reconfigurable soft radio; Radio and Wireless Conference, 2000. RAWCON 2000. 2000 IEEE; Date of Conference: 2000; Srikanteswara, Srikathyayani et al.; Mobile & Portable Radio Res. Group, Virginia Polytech. Inst. & State Univ., Blacksburg, VA, USA.*

Mitola, III, "Software Radios Survey, Critical Evaluation and Future Directions", IEEE AES Systems Magazine, pp. 25-36, Apr. 1993.

Mitola, "The Software Radio Architecture", IEEE Communications Magazine, pp. 26-36, May 1995.

Noblet et al., Assessing The Over-The-Air Software Download For Reconfigurable Terminal, The Institution of Electrical Engineers, pp. 1-6, 1998.

Mitola, III, "Software Architecture: A Mathematical Perspective", IEEE Journal on Selected Areas in Communications, vol. No. 17, Issue No. 4, pp. 514-538, Apr. 1999.

Tuttlebee, "Software-Defined Radio: Facets of a Developing Technology", IEEE Personal Communications, pp. 38-44, Apr. 1999.

Leppanen et al., "Software Radio—An Alternative for the Future in Wireless Personal and Multimedia Communications", IEEE, pp. 364-368, 1999.

Srikanteswara et al., "A Software Radio Architecture for Reconfigurable Platforms", IEEE Communications Magazine, pp. 140-147, Feb. 2000.

Koshima et al., "Personal Locator Services Emerge", IEEE Spectrum, pp. 41-48, Feb. 2000.

Moessner et al., "Terminal Reconfigureability—The Software Download Aspect", 3G Mobile Communication Technologies, Conference Publication No. 471, IEEE, pp. 326-330, 2000.

Justic et al., "Estimation of Message Source and Destination from Network Intercepts", IEEE Transactions on Information Forensics and Security, vol. 01, Issue 03, pp. 374-385, 2006.

Wang et al., "Throughput vs Distance Tradeoffs and Deployment Considerations for a Multi-Hop IEEE 802.16e Railroad Test Bed", Vehicular Technology Conference, pp. 2596-2600, 2008.

* cited by examiner

COMMUNICATIONS SYSTEM AND METHOD FOR A RAIL VEHICLE

FIELD OF THE INVENTION

Embodiments of the invention relate to data communications. Other embodiments relate to data communications from a rail vehicle.

BACKGROUND OF THE INVENTION

A vehicle "consist" is a group of two or more vehicles that are mechanically coupled or linked together to travel along a route. Trains may have one or more consists of goods or passenger cars, and one or more locomotives or locomotive consists. In general, trains may be referred to as rail vehicles comprising one or more locomotive consist and/or railcar consists. Locomotives in a locomotive consist include a lead locomotive and one or more trail locomotives. A train generally has at least one lead locomotive consist, and may also have one or more remote locomotive consists positioned further back in the train. In a narrower, more specific sense, a locomotive consist is a group of locomotives in a train that are controlled or operated together for motoring and braking purposes.

While traveling, the train may require communication with one or more dispatch centers, maintenance centers, or other local stations, which are off board/remote from the train (not on or part of the train) and positioned within a particular geographical region. Particularly, a locomotive operator may require such off board communications between the locomotive and the off board local stations for a safe and optimal operation of the train, for scheduling maintenance, for receiving dispatch instructions, etc.

Accordingly, there exists a need for systems and methods for helping the locomotive operator in managing such communications effectively.

BRIEF DESCRIPTION OF THE INVENTION

Embodiments of the present invention relate to a system and method for communicating data, including voice data, off board a rail vehicle. In one embodiment of the method, a first location of the rail vehicle is determined. A communications device is located on the rail vehicle and configured for communications off board the rail vehicle. A control setting of the communications device is determined based on the first location of the rail vehicle. The communications device is controlled automatically based on the determined control setting. The control setting comprises a designated communication channel for use in communicating with rail vehicles in a particular geographical region, among other settings.

Another embodiment relates to a communication system for communicating off board a rail vehicle. The system comprises a locator element, a communications device, and a control module located on the rail vehicle. The locator elements provide a location information of the rail vehicle to a control module. The control module is coupled to the communications device and the locator element. The control module determines control settings for controlling the operations of the communications device based on the location of the rail vehicle. The communications device sends and/or receives data, including communications data, off-board the rail vehicle.

It should be understood that the brief description above is provided to introduce in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Still further, the foregoing brief description, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, any computer/controller instructions (e.g., software programs) described herein may be stand-alone programs, may be incorporated as subroutines in an operating system, may be functions in an installed software or hardware package, and the like. The various embodiments are not limited to the arrangements and instrumentality shown in the drawings.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
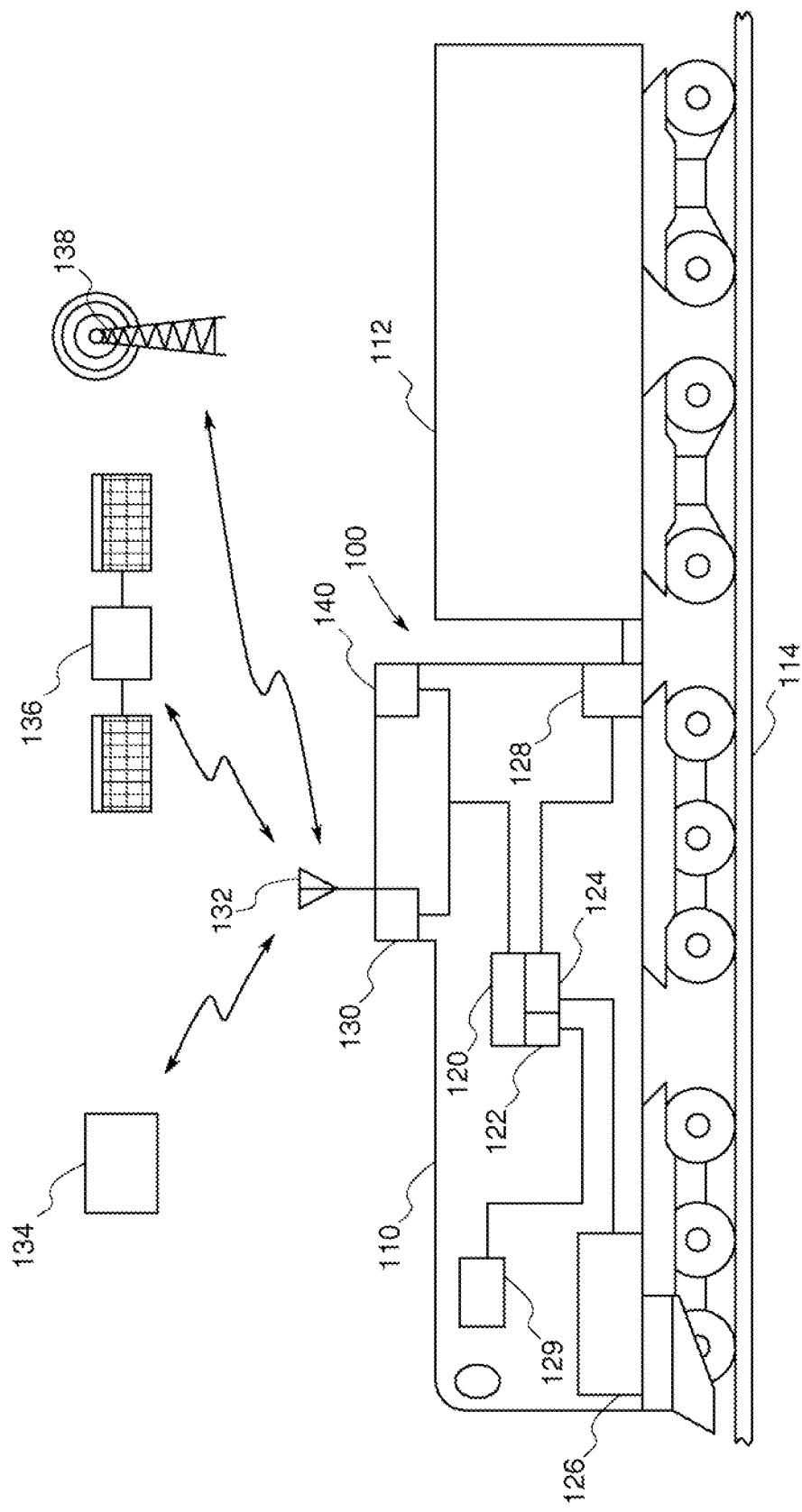
FIG. 1 is a schematic diagram of a communication system in a rail vehicle, according to an embodiment of the present invention.

As described in more detail below, embodiments of the present invention provide a communications system and method 200 for a rail vehicle consist (for example, a train or portion thereof) or other rail vehicle 100. In one embodiment of the system 200, for example, with reference to FIGS. 1 and 2 in overview, the system 200 includes a wireless communications device 130 and a control module 124 operably coupled to the wireless communications device 130. The wireless communications device 130, which is on board the rail vehicle, is configured for communications with an off-board location 134, such as other trains or a dispatch center/office. In operation, the control module 124 automatically determines a control setting of the communications device 130 (from among a plurality of possible control settings) based on a current location of the rail vehicle, and automatically controls the communications device 130 based on the determined control setting (possibly including changing the communications device from a current control setting to a new control setting). The control setting may comprise a designated communication channel for use in communicating with rail vehicles in a particular geographic region (e.g., the geographic region in which the rail vehicle is currently located), among other operational configurations such as communications device volume and/or display settings, default communication messages, or the like. The communication system and method 200 of the present invention facilitate automatic changeover of wireless communications device control settings in a rail vehicle, which is particularly advantageous where the control settings are complex, e.g., 6-digit radio channel codes.

Referring now to FIG. 1, the rail vehicle (e.g., train) 100 may include a locomotive or a locomotive consist 110, one or more of railcars 112, and additional locomotives or locomotive consists (not shown). Each locomotive or locomotive consist 110 and the railcars 112 are mechanically coupled together to form a series of linked vehicles. The train 100 is configured to travel on a track 114. As used herein, the terms "rail vehicle," "railway vehicle consist," and "train" may be used interchangeably within the specification without changing the scope of the invention; unless otherwise specified, "rail vehicle" refers to a vehicle, or series of linked vehicles, that travels along a track, rail, or other guideway.

One or more locator elements 140, configured to determine a location of the train 100, are provided on board the train 100. The locator elements 140 include, for example, a GPS (global positioning system) sensor in communication with one or more satellites 136, or a system of sensors, that determines a location of the train 100. Examples of such other systems include, but are not limited to, wayside devices, such as radio frequency automatic equipment identification (RF AEI) tags, cellular network devices, and/or video determination, and various modes of wireless communications, for example, by communicating with a communications tower 138. Another system may include the tachometer(s) aboard the train 100 for distance calculations from a reference point. In certain embodiments, a control system for the train 100, for example, a trip optimizer system 122, may be used to determine the location of the train 100. Further information about a trip optimizer system may be found in U.S. Published Application No. 20070219680 dated Sep. 20, 2007, incorporated by reference herein in its entirety. The trip optimizer system 122 may also provide a location of the train 100, and accordingly, is an example of the locator element 140. As used herein, the term "locator element" will be understood to refer to one or more locator elements, including the locator elements as described herein, or any other device capable of tracking and providing the location of an object (rail vehicle).

The train further includes the communications device 130 (e.g., a radio 130) to allow for communications between trains and/or with an off board location, such as a dispatch 134. As used herein, the terms "communications device" and "radio" may be used interchangeably within the specification without changing the scope of the invention, each referring to a device or system for wireless communications, unless otherwise specified.

A processor 120 is provided that is operable to receive information from the locator element 140, a track characterization element 126, and one or more sensors 128. The processor 120 is a microcontroller-based processor such as those generally known in the art. It is appreciated that the processor 120 may be operable in conjunction with several components (not shown in the figures) such as memory, input/output devices, support circuits, among several others, generally known in the art. The control module 124 of the communications system and method 200 is configured to determine control settings for the radio 130. The control module 124 is also configured to automatically determine and change the control settings for the radio 130 based on the location of the train 100. The control module 124 is operable with or as part of the processor 120. Further, the trip optimizer system 122 is operable with, or as part of, the processor 120, or any other processor (not shown).

The train 100 may further include an audio-visual display device 129 configured to display a message for the attention of an operator of the train 100 such as the current signal, and a designated speed of the track section. The message may further include one or more of a control setting of the communications device or an operational parameter of the rail vehicle comprising one or more of speed of the rail vehicle, time to reach destination, time elapsed from a previous stoppage, journey time, estimated distance at which the control setting may be changed, estimated time at which the control setting may be changed, distance to destination, or distance covered during the journey. The display device 129 is further configured to annunciate one or more of such informational items, including but not limited to, the current control setting of the radio 130, including annunciating the communications channel/frequency that the communications device has been changed to.

Figure 2:
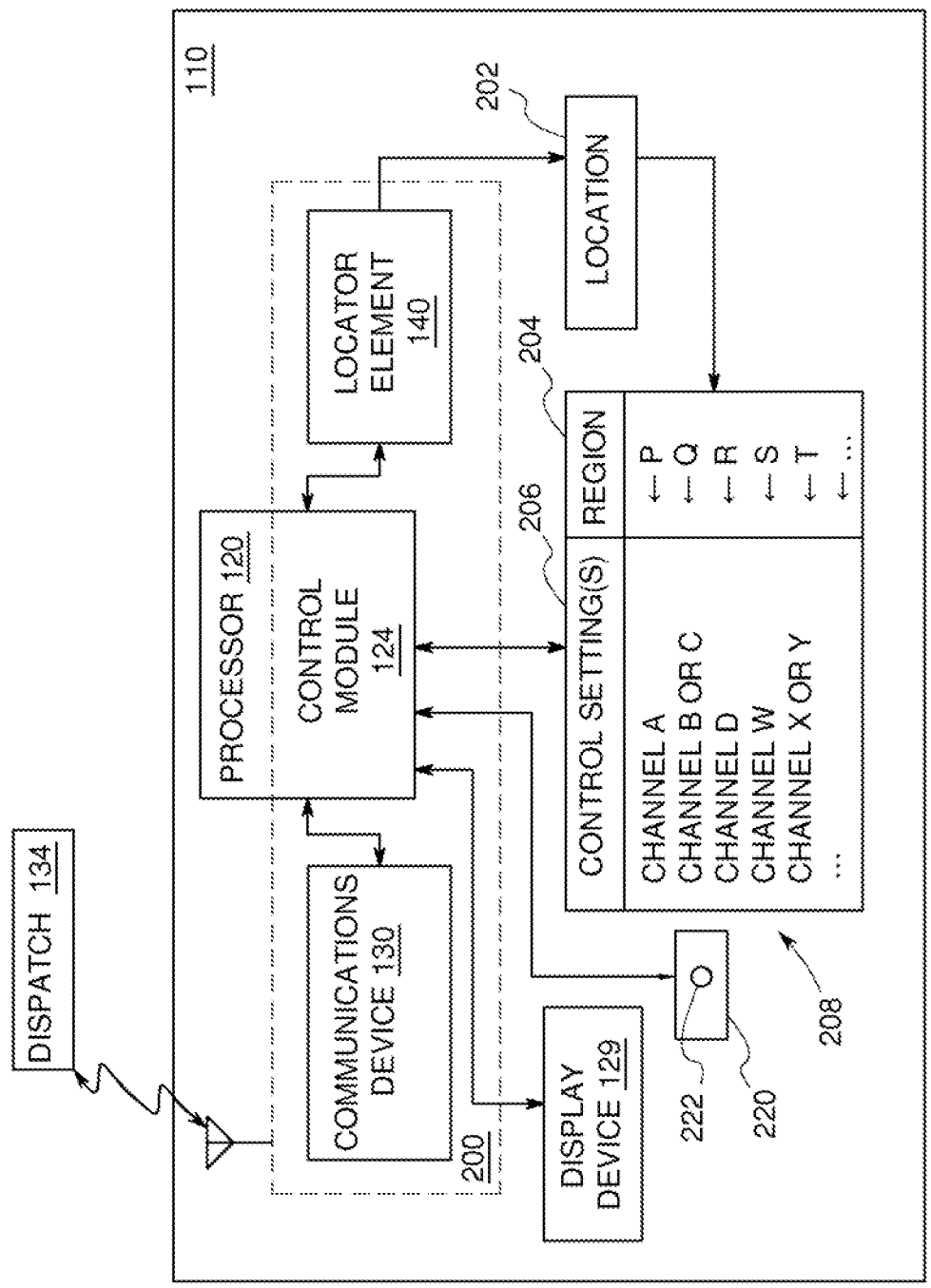
FIG. 2 is a simplified block diagram representation of a communication system in a rail vehicle, according to an embodiment of the present invention.
Figure 4:
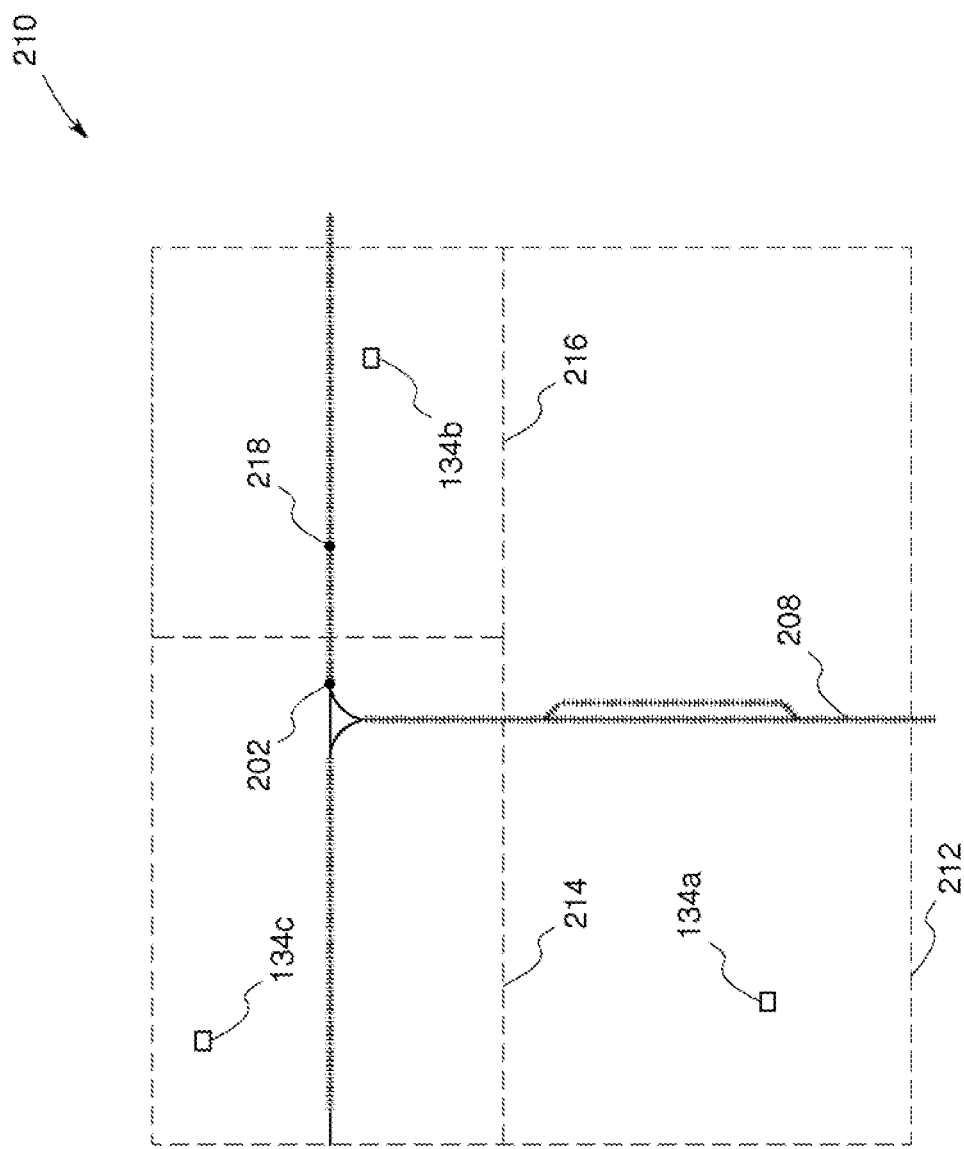
FIG. 4 is a partial schematic diagram of a rail transportation system in relation to a geographic region.

FIG. 2 illustrates a simplified schematic representation of the system 200 for communications off board the train 100 as described with respect to FIG. 1, according to an embodiment of the present invention. The communications system 200 comprises the locator element 140, including one or more of the locator elements 140 discussed with respect to FIG. 1, the communications device 130, and the control module 124. Each of the locator elements 140 is configured to provide information on a location 202 of the train 100, e.g., a current geographic location of the train. The communications device 130 is configured to send and/or receive communications off-board the train 100, for example, to the dispatch 134. In the illustrated embodiment, the communications system 200 is located within the locomotive 110, but may be equivalently located anywhere on the train 100. The control module 124 is communicably coupled to the communications device 130 and to the locator element 140. The control module 124 may be embodied as a set of instructions, that when executed by the processor 120, cause the processor 120 to compute a control setting 206 based on location 202 information involving the train 100, for example, and to apply the determined control settings 206 to the communications device 130. In an embodiment, the control settings 206 for the communications device 130 are determined based on the location 202 information of the train 100 as the train 100 moves across geographic regions 212, 214, 216 (see FIG. 4) having pre-specified channel or frequency settings 206 for communications off-board the train 100 using the communications device 130. In one embodiment, when the control module 124 determines that the train 100 transitions from a current geographic region 212, which has a current/present designated control setting (e.g., designated communication channel/frequency) of the communications device, to a new geographic region 214, which has a new, different designated control setting of the communications device, the control module 124 automatically determines the new designated control setting, and automatically controls the communications device 130 for switching to the new designated control setting. In some embodiments, the control module 124 is further configured to display and/or annunciate various control settings, status messages, and other information through the display device 129.

In one embodiment, the control module 124 has access to the information from the locator elements 140 and/or information from the trip optimizer system 122, processor 120, and/or other train control subsystem, to create a communications control plan to change control settings 206 of the communications device 130 based on the communications control plan. For example, the control module 124 may have access to the location information and information on a heading (direction of travel) and speed of the rail vehicle, which allows the control module to determine when the rail vehicle will transition from first to second geographic regions 212, 214, each having a different designated control setting for the communications device 130, and to plan accordingly. In another embodiment, the control module 124 has access to a trip plan or other information provided by the trip optimizer system 122, to change control settings 206 of the communications device 130 based at least in part on the trip plan (e.g., the control settings may be changed based on both the trip plan and other information, such as location information independently provided from a locator element or other source).

In one embodiment, control settings 206 are automatically determined using a database or other data structure 208 accessible by the control module 124. The database 208 includes a list (or other data set) 204 of geographic regions 212, 214, 216 of a transportation system 210 (e.g., railroad system owned/operated by a railroad company) in which the train operates. Associated with each geographic region 204 in the database 208 is one or more designated control settings 206 for off-board train communications in the geographic region. In operation, subsequent to the location 202 of the train being determined, the determined location is cross-referenced to the geographic regions 204 in the database, for identifying the region in which the train is currently located. Based on the identified region, the designated control settings 206 for that region are determined by cross-referencing the identified region to the control settings 206 associated with that region in the database 208.

According to certain embodiments, a user interface 220 for operating the communications device 130 is provided. The user interface 220 comprises, among other input means, a button 222 configurable to apply control settings to the communications device 130, such as control settings provided by the control module 124, for example. In certain other embodiments, control settings may be provided by a locomotive operator through the user interface and/or the control module 124. The button is configured to apply the provided control setting to the communications device 130. More specifically, the communications device (and/or user interface or control module) is configured to switch to the provided control setting upon the button being actuated by a human train operator. Those skilled in the art will readily appreciate that the functionally of the button may be replaced by several other known modes of input without changing the scope and spirit of the invention. According to another embodiment, the button is an input device associated with the processor 120, configured to provide input to the control module 124.

Figure 3:
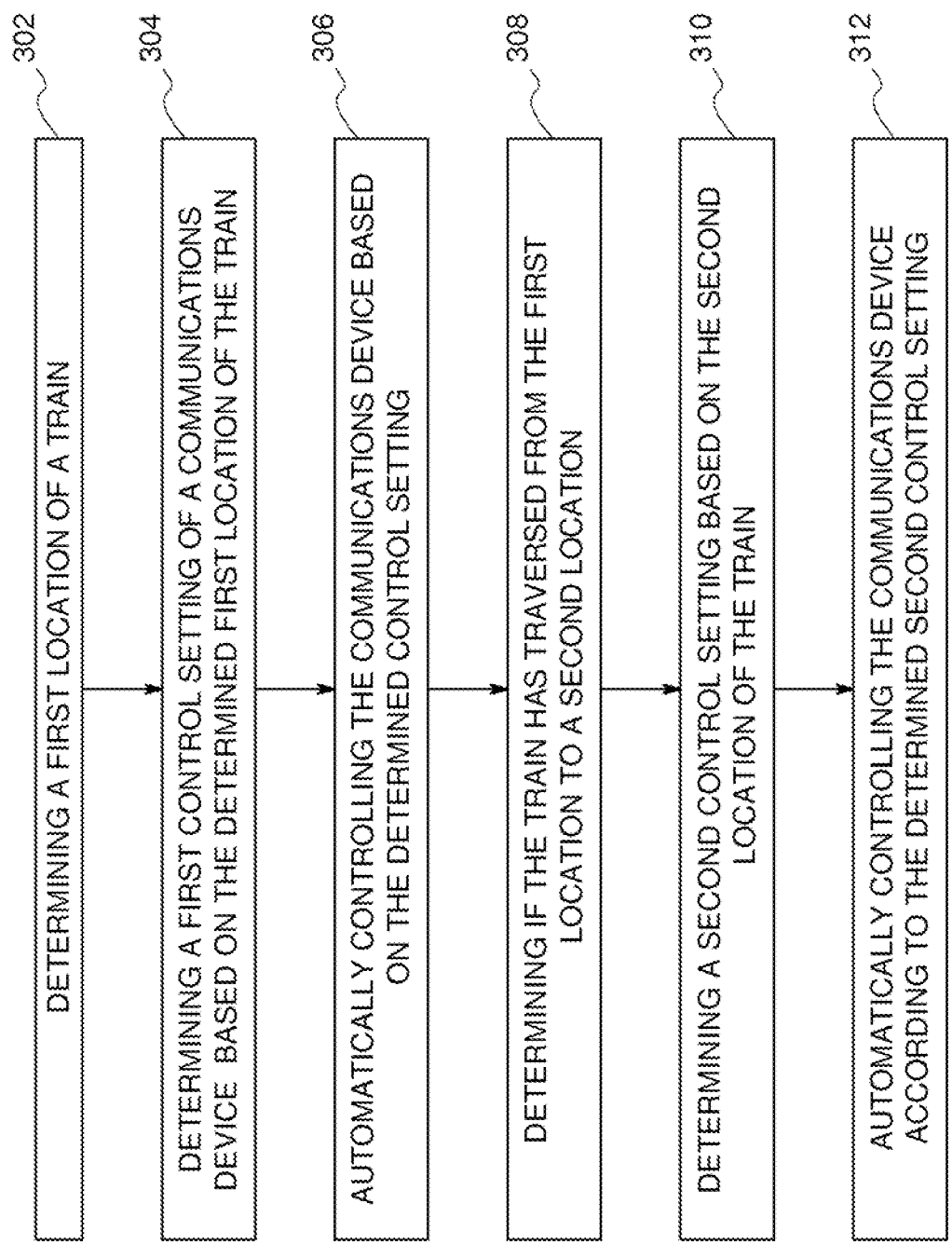
FIG. 3 is a flowchart illustrating a communication method according to an embodiment of the present invention.

FIG. 3 illustrates a method 300 for communicating data for a rail vehicle, for example the train 100. At step 302, a first location 202 of the train is determined. At step 304, a control setting 206 of a communications device 130 is determined based on the first location 202 of the train 100. At step 306, the communications device 130 is controlled based on the control setting 206 determined at step 304. In one embodiment, the control setting comprises a designated communication channel for use in communicating with rail vehicles in the geographic region of the determined location of the rail vehicle. For example, with reference to FIG. 4, a transportation system 210, comprising a network of railroad tracks 208, may be divided into a plurality of geographic regions 212, 214, 216. For each geographic region 212, 214, 216, there are one or more control settings 206 designated for use in communications between trains or other rail vehicles and a dispatch center/office or other off-board location 134a, 134b, 134c, respectively, within the geographic region. The designated control settings may be unique for each region, e.g., none of the regions has any of the same control settings, or alternatively there may be overlap in control settings, e.g., one region may share one or more of the same designated control settings with other regions. At step 306, the communications device 130 may be controlled automatically, based on the control setting 206 determined at step 304, to automatically switch over from its current control setting to the determined control setting. Alternatively, a new control setting may be determined, but some additional input, action, or determination is required for switching to the new control setting from a current control setting of the communications device.

For example, according to one embodiment, the locomotive operator is notified of the determined control setting 206. The control setting 206 is provided to the communications device 130 by the control module 124. Pressing the button (as discussed above) on the user interface of the communications device 130 causes the control setting 206 to be applied to the communications device 130. Until the button is pressed, the determined control setting 206 is not applied to the communications device, with the communications device remaining at a previous control setting. In one embodiment, after the determined control setting 206 is applied to the communications device based on the button being actuated, further pressing the button results in no change to the communications device 130, until such time as an alternate control setting is provided to the communications device 130. According to an embodiment, the display device 129 notifies the locomotive operator of the application of the control setting 206 to the communications device 130.

In one embodiment, steps 302, 304, and 306 are carried out sequentially on a regular periodic basis, for example, a time period of every 5-10 minutes, and/or every time when the train 100 travels a designated distance of, e.g., 5 or 10 km (3.1 or 6.2 miles). Each time, upon step 306 being carried out, the system pauses for the designated time period and/or designated distance to be traveled, and then transitions back to repeating steps 302, 304, 306. The advantage of such a control scheme is that it utilizes a simplified and easy to implement control process, which does not involve comparing the determined first location (step 302) to previously determined location information. Although FIG. 3 indicates step 306 as involving automatically controlling the communications device, the communications device may instead be controlled based on button actuation (or the like) as discussed above.

In another embodiment, steps 302, 304, and 306 are carried out sequentially on a regular periodic basis, for example, a time period of every 5-10 minutes, and/or every time when the train 100 travels a designated distance of, e.g., 5 or 10 km (3.1 or 6.2 miles). However, at step 306, the communications device is only automatically controlled (or controlled based further on button actuation or another control input or information) if it is determined that the first control setting (determined in step 304) is different from a current control setting of the communications device.

According to another embodiment, the method includes additional or alternative steps. For example, at step 308, a determination may be made that the train 100 has traversed from the first location 202 to a second location 218. This may be done by comparing different location information determined at different points in time, e.g., sequentially determined location information. It is noted that a first communication channel (or other control setting) is used for communicating with the train 100 at the first location 202, while a second communication channel (or other control setting) is used for communicating with the train 100 at the second location 218. The method proceeds to step 310, at which one or more second control settings of the communications device 130 are determined. At step 312, the communications device 130 is controlled (automatically or otherwise) according to the second control settings determined at the step 310. That is, the communications device 130 is automatically (or otherwise) controlled by switching the communications device 130 from the first control setting (e.g., comprising a first, current channel) to a second control setting (e.g., comprising a second, new channel). According to one embodiment, the locomotive operator is notified of a change in the control setting 206, and a new control setting determined at step 310 is provided to the communications device 130 by the control module 124. According to an embodiment, pressing the button on the user interface of the communications device 130 causes the new control setting determined at the step 310 to be applied to the communications device 130. Typically, the locomotive operator may press the button in response to the notification of the change in the control setting 206, such that the new control setting may be applied to the communications device 130. According to an embodiment, the display device 129 notifies the locomotive operator of the application of the new control setting to the communications device 130.

According to one embodiment, determining a location 202 of the train 100 comprises using information from one or more of the locator elements 140 as discussed above. Any one or more of the locator elements 140 may have an assigned priority order according to which a specific locator element is used for obtaining the location of the train 100.

According to another embodiment, determining a location of the train 100 comprises obtaining location information from multiple locator elements 140 (at least two), for example, from a GPS sensor, wayside devices such as radio frequency automatic equipment identification (RF AEI) tags, dispatch, cellular network devices, video determination, tachometer(s) aboard a locomotive and distance calculations from a reference point, and/or the trip optimizer system or other train control system. In this embodiment, a first concurrent location information and a second concurrent location information are obtained from two different locator elements. "Concurrent" location information means that the two location information are obtained at the same time or within a very short time of one another, e.g., at or within 1 second of one another, for ensuring that if the locator elements are functioning properly, they will reflect the same location (or two locations very close to one another).

In certain cases, the first and the second concurrent location information may not match, either exactly or within a designated error threshold (e.g., if a first location information and a second location information do not match exactly, but are within a designated error threshold of one another, then they are deemed as matching). In some of such cases, for which the first and the second concurrent location information are different, however, the channel or other control setting determined for dispatch communication using the radio 130 for both the first and the second location information is the same, no resolution is required. However, in other such cases, in which the first and the second concurrent location information do not match, the channel or other control setting(s) specified for the first location information is different than the channel or other control setting(s) specified for the second location information. In such cases, the concurrent location information from different locator elements is at a conflict, and a resolution may be required between the two channels or other control setting(s).

According to a method for resolving the conflict, the first concurrent location information and the second concurrent location information at are received from two different locator elements, and the two concurrent location information are compared.

If the concurrent location information matches (either exactly, or, in another embodiment, exactly or within a designated error threshold), the conflict is resolved, in one embodiment, by using either the first or the second location information (e.g., the control module 124 may, arbitrarily or in a predefined order, choose one of the two location information to use). According to another embodiment, an average value of the two concurrent location information values is used. According to another embodiment, the concurrent location information provided by the locator element receiving the strongest signal is chosen.

If the channel (or other control setting) determined based on the first concurrent location information and the second concurrent location information is the same, no further conflict resolution is required. If, however, the channel (or other control setting) determined using the first concurrent location information and the channel (or other control setting) determined using the second concurrent location information do not match, then one or more of the approaches identified by the following embodiments may be adopted to resolve the conflict. According to one embodiment, the first and the second concurrent location information are re-determined. That is, the control module 124 instructs the corresponding locator elements to concurrently re-determine each of the location information, and the re-determined concurrent location information are then compared. In another embodiment, an operator at a dispatch 134 location is contacted for input to resolve the channel for dispatch communications using the communications device 130 (or other control setting). According to another embodiment, the system 200 uses the location information that is more likely to be accurate (based on the previous location of the rail vehicle or otherwise). In other embodiments, the system 200 may use the trip optimizer system, or historical data from other locator elements as discussed to arrive at the more likely accurate location information. According to yet another embodiment, the system 200 sends a message test on a first channel (or otherwise based on a first control setting) determined according to the first location information. The message test is carried out by attempting to communicate to a designated off-board recipient (e.g., dispatch) according to the first channel or other control setting, and waiting for a designated response. If an appropriate designated response is received, the first control setting is applied to the communications device 130. If however, an appropriate designated response is not received, a message test is conducted to determine the validity of a second control setting based on the second location information. The message test is carried out by attempting to communicate to a designated off-board recipient (e.g., dispatch) according to the second control setting, and waiting for a response. If an appropriate response is received, the second control setting is applied to the communications device 130. An appropriate response may include a designated response, for example, a confirmation by an operator at the dispatch site, or any other pre-decided confirmation signal sent by the dispatch to the communications device 130.

In certain cases, neither the first control setting nor the second control setting is workable/appropriate. In such cases, several approaches may be taken to resolve the situation. According to an approach, the locomotive operator is prompted for an input on which control setting to use. According to another approach, the system uses the location information more likely to be accurate. According to another approach, the system 200 instructs the corresponding sources (locator elements) of the first and the second location information, to re-determine the first and the second location information. Alternatively, the system 200 may utilize locator elements other than those used to provide the first and the second location information ("new" locator elements), to concurrently provide one or more new location information value(s). Thereafter, the system conducts message tests, as described above, to determine the appropriate control setting for one or more of the first, the second, and/or the new location information.

Another embodiment relates to a method for retrofitting rail vehicles, for example the train 100, for communications off-board the train 100. The train 100 is already fitted with one or more wireless communications devices, for example the radio 130. The method for retrofitting comprises interfacing or integrating the communications device 130 with a control module, for example the control module 124. The control module 124 is configured to receive location information of the train 100, and is further configured to determine and apply appropriate control settings including a communication channel for the communications device 130.

In one embodiment, the radio/communications device 130 is of the type that includes an auxiliary control input (e.g., serial connector) for connection to a computer system. In the illustrated embodiment, the communications device 130 is connected to the control module 124, or to the processor 120. In alternate embodiments, the communications device 130 is connected to another component in the train that communicates with the control module 124, by way of the auxiliary control input. The communications device 130 is configured to receive control commands over the auxiliary control input according to a designated protocol. The control module 124 is programmed (or otherwise outfitted) with the protocol, for processing and outputting control commands (e.g., specifying a designated radio channel or other control setting) in a format understandable by the communications device 130.

As noted, the communications device 130 is configured for communications off board the rail vehicle. In one embodiment, the communications device is configured for long distance off-board wireless communications, meaning wireless communications with an off-board location positioned at least 100 meters away from the communications device (as opposed to local/wayside communication with devices proximate the train).

Another embodiment relates to a method for communicating data for a rail vehicle. The method comprises determining a first location of the rail vehicle. The method further comprises determining a new control setting of a communications device based on the determined first location of the rail vehicle. The communications device is located on the rail vehicle and is configured for communications off board the rail vehicle. The new control setting is automatically provided to the communications device. The new control setting comprises a designated communication channel for use in communicating with rail vehicles in a first geographic region. ("New" control setting refers to a control setting different from a current, existing control setting, or, if there is no current control setting, a control setting which the communications device is switched into initially.)

In another embodiment, the method further comprises automatically (without human intervention) switching the communications device from a current control setting of the communications device to the new control setting.

In another embodiment, the method further comprises determining that the rail vehicle has transitioned from a second, previous location to the first location. The current control setting is a designated communication channel for use in communicating with rail vehicles in a second geographic region that encompasses the second, previous location.

In another embodiment, the method further comprises informing a human operator of the new control setting. If the operator actuates a designated user interface (e.g., button), the communications device is automatically switched from a current control setting of the communications device to the new control setting.

In another embodiment, the first location is determined by comparing a first concurrent location information from a first locator element to a second concurrent location information from a second, different locator element. If the first concurrent location information and the second concurrent location information match within a designated threshold, the first location is determined based on the first concurrent location information and/or the second concurrent location information. On the other hand, if the first concurrent location information and the second concurrent location information do not match within the designated threshold, the first location is determined using a conflict resolution process.

In another embodiment, rail vehicle locations are determined based at least in part on switching between plural locator elements, e.g., GPS unit located on the rail vehicle, wayside device, control system of the rail vehicle, cell phone network device, or the like. This may involving switching between using two different locator elements for determining concurrent location information, switching between alternate locator elements each time a location is determined, using a different locator element if a first or primary locator element fails, switching between locator elements for determining new location information, or the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present invention will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described communications system and method for a rail vehicle, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method for communicating data for a vehicle, the method comprising:
    determining a first location of the vehicle;
    determining a first control setting of a communications device based on the determined first location of the vehicle, the communications device being located on the vehicle and configured for communications off board the vehicle;
    automatically controlling the communications device based on the first control setting, wherein the first control setting comprises a designated first communication channel for use in communicating with vehicles in a particular geographic region;
    automatically determining that the vehicle is traversing and/or has traversed from the first location where the first control setting is used for communicating with the vehicle, to a second location where a second control setting is used for communicating with the vehicle, wherein the second control setting comprises a designated second communication channel for use in communicating with vehicles in a region comprising the second location; and
    controlling the communications device by automatically switching the communications device from the first control setting to the second control setting.

2. The method of claim 1, wherein the first location and/or the second location are determined using information from one or more locator elements, the locator elements comprising at least one of a GPS unit located on the vehicle, a wayside device, a control system of the vehicle, and/or a cell phone network device.

3. The method of claim 2, wherein the first location and/or the second location are determined based at least in part on switching between at least one of the GPS unit located on the vehicle, the wayside device, the control system of the vehicle, and/or the cell phone network device.

4. The method of claim 2, wherein the first location and/or the second location are determined at least in part by comparing concurrent location information from multiple locator elements.

5. The method of claim 1, further comprising displaying and/or annunciating a message, wherein the message relates to at least one of a control setting of the communications device and/or an operational parameter of the vehicle comprising one or more of a speed of the vehicle, a designated speed for the vehicle for a particular section of a route, a time to reach destination, a time elapsed from a previous stoppage, a journey time, an estimated distance at which the control setting may be changed, an estimated time at which the control setting may be changed, a distance to destination, a distance covered during the journey, or a current signal for the vehicle.

6. The method of claim 1, wherein automatically controlling the communications device based on the first control setting comprises:
    automatically providing the first control setting to the communications device;
    annunciating the first control setting to an operator; and
    applying the first control setting to the communications device upon receiving an operator input.

7. A method for communicating data for a vehicle, the method comprising:
    determining a first location of the vehicle, wherein the first location is determined by comparing a first concurrent location information from a first locator element and a second concurrent location information from a second locator element;
    determining a first control setting of a communications device based on the determined first location of the vehicle, the communications device being located on the vehicle and configured for communications off board the vehicle; and
    automatically controlling the communications device based on the first control setting, wherein the first control setting comprises a designated first communication channel for use in communicating with vehicles in a particular geographic region;
    wherein determining the first control setting comprises:
        determining the first control setting based on the first concurrent location information;
        determining a second control setting based on the second concurrent location information; and
        determining that a conflict has occurred if the first control setting is not the same as the second control setting.

8. The method of claim 7, further comprising re-determining the first concurrent location information and the second concurrent location information.

9. The method of claim 7, further comprising receiving the first control setting from a dispatch located off board the vehicle.

10. The method of claim 7, further comprising determining the first control setting using the first concurrent location information, wherein the first concurrent location information is likely to be more accurate than the second concurrent location information.

11. The method of claim 7, further comprising:
conducting a message test on the communications device configured according to the first control setting; and
preserving the first control setting as a current control setting of the communications device if a designated response is received on the communications device configured according to the first control setting.

12. The method of claim 7, further comprising receiving one or more new location information, respectively, from one or more new locator elements, for resolving the conflict.

13. A method for communicating data for a vehicle, the method comprising:
determining a first location of the vehicle;
determining a new control setting of a communications device based on the determined first location of the vehicle, the communications device being located on the vehicle and configured for communications off board the vehicle;
automatically providing the new control setting to the communications device, wherein the new control setting comprises a designated communication channel for use in communicating with vehicles in a first geographic region;
automatically switching the communications device from a current control setting of the communications device to the new control setting; and
determining that the vehicle has transitioned from a second, previous location to the first location, wherein the current control setting is a designated communication channel for use in communicating with vehicles in a second geographic region that encompasses the second, previous location.

14. The method of claim 13, further comprising:
informing a human operator of the new control setting; and
if the operator actuates a designated user interface, automatically switching the communications device from a current control setting of the communications device to the new control setting.

15. The method of claim 13, wherein:
the first location is determined by comparing a first concurrent location information from a first locator element to a second concurrent location information from a second, different locator element;
if the first concurrent location information and the second concurrent location information match within a designated threshold, the first location is determined based on the first concurrent location information and/or the second concurrent location information; and
if the first concurrent location information and the second concurrent location information do not match within the designated threshold, the first location is determined using a conflict resolution process.

16. A method for communicating data for a vehicle, the method comprising:
determining a first location of the vehicle;
determining a new control setting of a communications device based on the determined first location of the vehicle, the communications device being located on the vehicle and configured for communications off board the vehicle;
automatically providing the new control setting to the communications device, wherein the new control setting comprises a designated communication channel for use in communicating with vehicles in a first geographic region;
informing a human operator of the new control setting;
if the operator actuates a designated user interface, automatically switching the communications device from a current control setting of the communications device to the new control setting; and
determining that the vehicle has transitioned from a second, previous location to the first location, wherein the current control setting is a designated communication channel for use in communicating with vehicles in a second geographic region that encompasses the second, previous location.

* * * * *